US012793514B2

(12) United States Patent
Connelly

(10) Patent No.: US 12,793,514 B2
(45) Date of Patent: Nov. 10, 2026

(54) MASSIVELY PARALLEL REAL-TIME REMOTE GAMEPLAY

(71) Applicant: Interblock d.o.o., Las Vegas, NV (US)

(72) Inventor: John Joseph Connelly, Las Vegas, NV (US)

(73) Assignee: INTERBLOCK D.O.O., Las Vegas, NV (US)

( * ) Notice: Subject to any disclaimer, the term of this patent is extended or adjusted under 35 U.S.C. 154(b) by 250 days.

(21) Appl. No.: 18/390,124

(22) Filed: Dec. 20, 2023

(65) Prior Publication Data

US 2025/0006010 A1 Jan. 2, 2025

Related U.S. Application Data

(60) Provisional application No. 63/585,899, filed on Sep. 27, 2023, provisional application No. 63/513,293, (Continued)

(51) Int. Cl.
*G07F 17/32* (2006.01)
*H04N 21/218* (2011.01)
(Continued)

(52) U.S. Cl.
CPC ...... *G07F 17/3288* (2013.01); *G07F 17/3211* (2013.01); *G07F 17/3223* (2013.01);
(Continued)

(58) Field of Classification Search
CPC ............. G07F 17/3288; G07F 17/3211; G07F 17/3223; G07F 17/3225; H04N 21/21805; H04N 21/472; H04N 21/4781
See application file for complete search history.

(56) References Cited

U.S. PATENT DOCUMENTS 8,123,618 B2 * 2/2012 Karmarkar .......... G07F 17/3223 463/28
9,811,977 B2 11/2017 Gonzalez-Roa et al.
(Continued)

FOREIGN PATENT DOCUMENTS

CN 106163623 A 11/2016
CN 111210576 A 5/2020
(Continued)

OTHER PUBLICATIONS

International Patent Application No. PCT/US2023/085623; Int'l Preliminary Report on Patentability; dated Feb. 6, 2025; 33 pages.
(Continued)

*Primary Examiner* — Kevin Y Kim
(74) *Attorney, Agent, or Firm* — Baker Hostetler

(57) ABSTRACT

The present disclosure relates to systems and methods for live gaming, remote gaming, and video stream switching. Various embodiments may stream a live video output of a gaming event to a plurality of remote user devices. The gaming event may be associated with a player machine being played by a live, local player. At least one remote user device may provide a wager corresponding to an outcome of a gaming event. Remote user devices may independently update the live video output to customize gameplay experience. The outcome of the gaming event may be provided, in real-time to the plurality of remote user devices, and wagers are resolved based on the outcome.

30 Claims, 10 Drawing Sheets

400

Related U.S. Application Data filed on Jul. 12, 2023, provisional application No. 63/511,062, filed on Jun. 29, 2023.

(51) Int. Cl.
*H04N 21/472* (2011.01)
*H04N 21/478* (2011.01)

(52) U.S. Cl.
CPC ... *G07F 17/3225* (2013.01); *H04N 21/21805* (2013.01); *H04N 21/472* (2013.01); *H04N 21/4781* (2013.01)

(56) References Cited

U.S. PATENT DOCUMENTS

| | | | | |
|---|---|---|---|---|
| 10,055,931 | B2 | 8/2018 | Greenbaum et al. | |
| 10,818,127 | B2 | 10/2020 | Greenbaum et al. | |
| 11,468,728 | B2 | 10/2022 | Greenbaum et al. | |
| 2002/0108125 | A1* | 8/2002 | Joao | H04N 21/4781 348/E7.071 |
| 2004/0023722 | A1 | 2/2004 | Vuong et al. | |
| 2021/0201622 | A1 | 7/2021 | Baker et al. | |
| 2021/0366225 | A1 | 11/2021 | Riggs et al. | |
| 2022/0078377 | A1 | 3/2022 | Mahadeva et al. | |
| 2022/0172563 | A9 | 6/2022 | McPhail | |
| 2023/0026194 | A1 | 1/2023 | Moody | |
| 2023/0113797 | A1 | 4/2023 | Palmisano et al. | |

FOREIGN PATENT DOCUMENTS

| | | | |
|---|---|---|---|
| TW | 201909059 | A | 3/2019 |
| TW | 202112421 | A | 4/2021 |
| TW | 202118540 | A | 5/2021 |
| TW | I790801 | B | 1/2023 |
| TW | M642226 | U | 6/2023 |
| WO | WO 2008/079779 | A2 | 7/2008 |

OTHER PUBLICATIONS

International Patent Application No. PCT/US2023/085623; Int'l Search Report and the Written Opinion; dated Apr. 12, 2024; 16 pages.

* cited by examiner

MASSIVELY PARALLEL REAL-TIME REMOTE GAMEPLAY

CROSS-REFERENCE TO RELATED APPLICATIONS

The present application claims a right to priority to U.S. Patent Application No. 63/585,899, filed Sep. 27, 2023, U.S. Patent Application No. 63/513,293, filed Jul. 12, 2023, and U.S. Patent Application No. 63/511,062, filed Jun. 29, 2023, the entireties of each of which are incorporated by reference herein.

TECHNICAL FIELD

The present disclosure relates generally, but not exclusively, to the field of gaming, particularly remote wagering on live games.

BACKGROUND INFORMATION

Casinos offer a variety of games to attract players. Such games may include live table games (e.g., roulette, craps, blackjack, etc.), virtual games, physical machines (e.g., slot-like machines), individual player machines, stadium-style group stations, and various gameplay combinations.

Traditionally, players must physically go to a casino or the gaming location to participate. However, this may not always be possible, and when players are unable to play at a casino, the casino does not receive the business and the player misses out on the gaming experience.

Although online gaming platforms provide one way for players to remotely participate in casino games and other gaming events, the online experience is very different than in-person and live gaming events at an actual location. Many players enjoy playing at a particular casino or gaming location, or a particular machine, but online gaming platforms cannot provide a comparable experience and familiarity.

Online and remote gaming also face challenges with providing a social atmosphere that keeps players engaged, interested, and part of a gaming community. At a physical gaming location, players are immersed in an environment with fellow players. Players and passersby can watch other players and live gaming events. In some cases, popular players and influencers may amass followers interested in watching their gaming activities. Gaming locations may be interested in taking advantage of these audiences and the interest in the gaming events occurring at the location. Increasing player interest and engagement opportunities may result in more gaming, greater profits, and player loyalty.

Additionally, players have many game types, options, and platforms available. Casinos and gaming providers must continuously innovate to attract and retain players, maintain profitability, and improve player experience.

SUMMARY

An embodiment is directed to a method for remotely wagering on a live gaming event, and enabling a plurality of remote players to make wagers on games played by another player. Aspects may stream live video output to a display associated with a remote user device, and the live video output may display a gaming event being played, by another player, on a player machine at a gaming location, such as a casino. In various examples, a selection from the user device may select a local player and/or a player machine shown in the live video output. The selection enables a remote player using the remote gaming device to watch a gaming event, such as a gaming event being played, by the local player, and the player machine. Aspects may receive a wager from the remote user device. The wager may correspond to an outcome of the gaming event. In some examples, a wager may be accepted during a betting window, such as a period of time before the local player takes an action with respect to the gaming event. The wager may also be associated with a player account, such as an account associated with the remote player. Aspects may further stream live video output of the gaming event to the remote user device, and resolve the wager based on the outcome of the gaming event.

According to various examples, the gaming event may be slots or another electronic game. In other examples, the gaming event may be slots, poker, roulette, craps, blackjack, sic-bo, baccarat, or a casino game. The streaming device may include a camera capturing at least one of the player machine and a display associated with the player machine. The streaming device may stream live gaming output generated by the player machine to the remote user device. Such embodiments enable remote players to bet, in real-time, on gaming events being played by a local player at a gaming location. The local player may be an influencer, celebrity, professional gamer, or other individual playing at the gaming location at the local player machine. According to various examples, a plurality of remote gaming devices may watch the live video streams and bet on the gaming events in real-time. In examples, the denominations of the bets made by the remote players are the same as the local player. In examples, the denominations of the bets made by the remote players are different from the local player. In examples, the denominations of the bets made by the remote players are higher or lower than the denomination of the bets by the local player. In examples, the currencies of each of the bets by remote and local players may be different. Such techniques provide additional gaming opportunities and gaming variety to players, and may encourage remote gaming.

Various embodiments further provide switching between a live video output and a live gaming output. Live video from a first camera may be changed, switched, zoomed in and out, and otherwise adjusted based on input from the user device. Live video and live gaming views may occur before, during, or after play to enhance player experience and customization during remote play. Such systems and methods may include a camera capturing a gaming area, a player machine, and an application operating on a user device. The user device may include at least one of a phone, a personal computer (PC), or a gaming device. The player machine may be an electronic table game. An external controller may connect to the user device to perform one or more gameplay operations. The external controller may connect to the user device via a Universal Serial Bus (USB).

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

Figure 1:
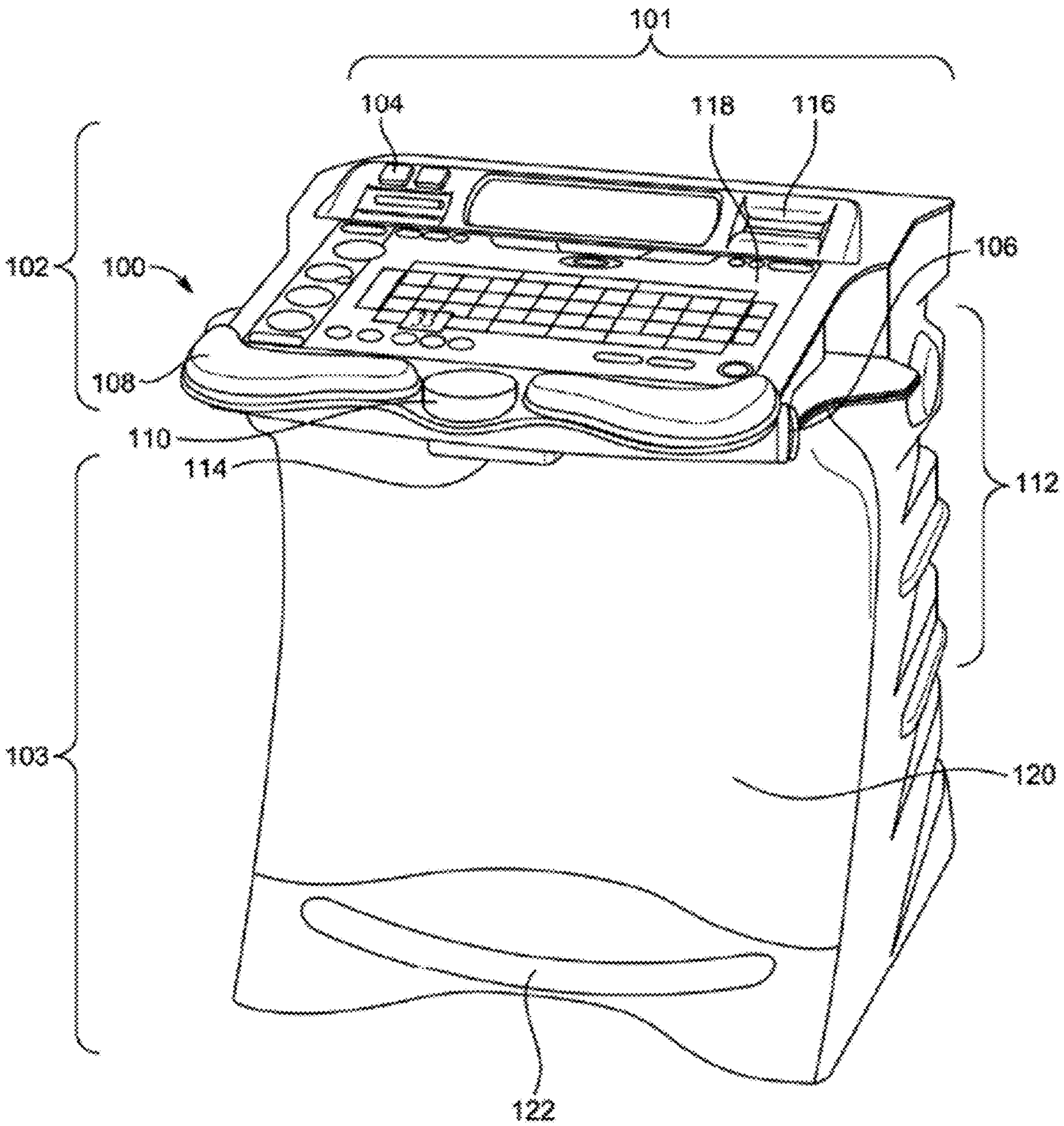
FIG. 1 is a diagrammatic, perspective view of an example base of a player machine, in accordance with an embodiment.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Disclosed herein are methods, systems, and computer readable storage media that provide video stream switching techniques for live gaming operations. According to various aspects, players may interact with a smartphone or other user device to view a gaming area (e.g., a gaming floor, casino pit, etc.) interact with a player machine (e.g., a gaming cabinet, an individual play station, etc.), and play live gaming events. A live video stream may provide live gaming floor views, and players may switch between cameras to see, for example, different views of the gaming floor or various player machines. Players may select a gaming machine, such as an individual player machine and operate the gaming machine, based on selections at the device. In some examples, a player may reserve individual gaming machines in advance and/or for exclusive use, thereby preventing other players from operating the machine. From the user device, players may also control camera views, and zoom in and out on a player machine, switch cameras (e.g., between the player machine and the gaming floor), and zoom in and out, and change views on different areas of the player machine (e.g., between a display, a control area, a gaming event, etc.).

Such techniques may provide seamless transitions between live gaming floor views and live gaming events at a player machine. Aspects may enable players to have additional control and customization of their overall gaming experience. For example, players may reserve particular machines, such as a frequently used, preferred, or “lucky” machine. The player machines may provide any of a variety of games, including but not limited to slots, roulette, poker, or another, card, dice, or video-based game. Such remote gaming techniques may lead to increased player interest and entertainment, and improved player experiences may result in increased play and profitability.

In addition, gaming establishments may create a dedicated gaming floor for remote gaming. A set of player machines may be located in a room, such as a casino pit, warehouse, room, or other area, and the player machines may be fully dedicated to remote gaming. In some examples, a player machine may be operable both in-person and remotely.

In either case, aspects enable a remote player to reserve the player machine in advance, thereby preventing other players from accessing and operating the player machine. According to some embodiments, a player machine may be exclusively reserved for a VIP player, high roller, or other player or player account. In such cases, only the player who has reserved the machine may operate the gaming machine remotely and/or in-person. The environment in which the player machine is exclusively reserved, such as a VIP room, may also be configured specifically for the player. The VIP room may be physically or virtually decorated in a manner chosen by the player or chosen for the player based on one or more criteria, such as color(s) preferences, decoration style, cultural preferences, furnishing preferences, historical time periods, etc.

A reserved machine may provide a first player a time window to operate the device and play live games. In some examples, the player may have a period of time to begin play before the player machine becomes accessible to another user. In other examples, the period of time may reserve a time window for remote play by the user device. In some instances, if a player does not initiate a game within a first period of time (e.g., one, ten, thirty minutes, etc.), the reservation may expire, and the player machine may become available to other players. In other examples, the reservation may enable exclusive access and operation for a second period of time (e.g., one, two, twelve, twenty-four hours, or more etc.). The player machine may also be exclusively reserved indefinitely for a particular player. A remote player may also be notified when a particular player machine is available for play. Such notifications can include an alert, text, email, call or a communication to the user device.

The various techniques and examples discussed herein enable gaming establishments to accommodate various player preferences, including but not limited to device and/or machine preferences, a type of game, time of play, and a gaming location. Such techniques may encourage and increase gaming, player entertainment, player satisfaction, and overall profitability.

FIG. 1 illustrates a base of a player machine in accordance with various aspects of the present disclosure. According to some examples, the player machine may include a universal cabinet. In some universal cabinet configurations, different games may be connected to a top 101 of an upper section 102 of the base 100. The base 100 may include a lower section 103 on which the upper section rests. As further illustrated in FIGS. 2 and 3A-3E, the player machine may include a number of exterior elements that provide visual and audio effects. Such exterior elements may serve to attract attention to the game, so as to entice someone passing by to play a game offered by the universal cabinet, or to enhance the play of a game being played at the player machine.

The exterior elements may include soft touch gel buttons, such as buttons 104 and 106, gel arm rests 108 at the bottom of the upper section 102 where a player's arms would rest for extended periods of time, and a control button 110 that may be usable for different games. Other lighting effects that may be provided include gel LED modules 112 of different sizes and shapes and an ambient LED 114 that illuminates the bottom section 103 from underneath the upper section 102. The upper section 102 may further include a money/credit/card receiving/payout mechanism 116 and a display 118. Speakers 120 in the lower section 103 may provide some or all of the sound, depending on the nature of the game being played. A foot rest 122 may also be built into the lower section 102.

The inside of the universal cabinet may include a controller module that may provide common connections for each of the different types of toppers and provide a USB connection to an embedded computer (not shown) in the bottom section 103. The embedded computer may be a GANLOT AMDY-7005, which is designed for gaming applications. The controller module may also provide outputs for the base cabinet lighting and buttons, which makes it possible to offer numerous gaming machine lighting designs. The controller module may also make it possible to quickly change toppers on the base 100. Only the upper section 102 may need to be removed to access the controller module. Connections from the existing topper may be disconnected and the topper removed from the upper section 102. The new topper may then be attached to the upper section 102 and its connections plugged into the controller module. In an embodiment, a switch in the controller module may then be switched to correspond to the new topper. In other embodiments, the new topper can be identified by connecting or plugging one or more additional modules for that topper into the controller module or changing a program of the embedded computer. This may make it possible to quickly change the type of game that is being played on the universal cabinet base 100 without have to remove the base 100 from any row it is in and without moving other machines or forcing the other machines to be shut down. This may also make it possible to prototype and develop other toppers for new games, further reducing development and production costs.

Figure 2:
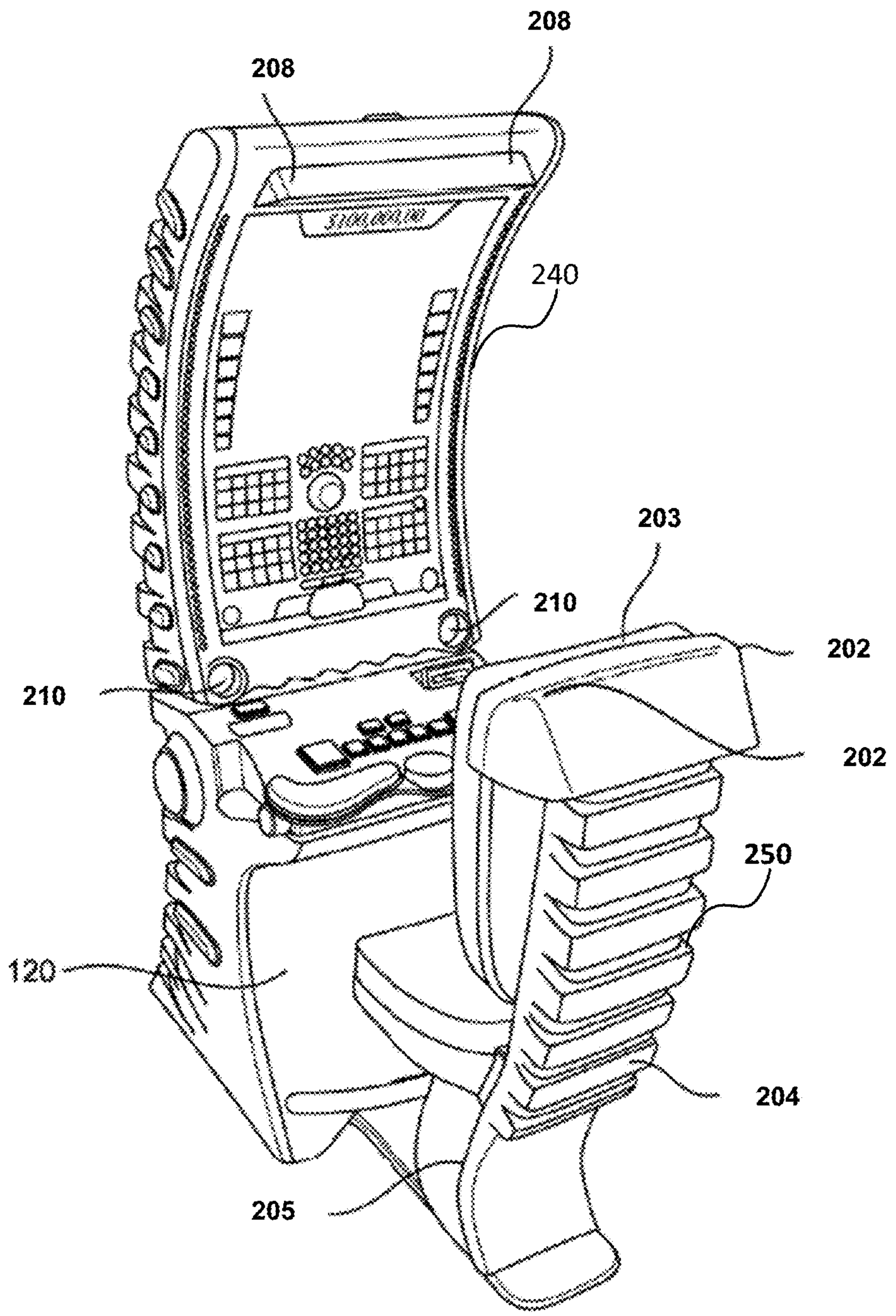
FIG. 2 is perspective view of a player machine including a seat, display topper, and audio effects components, in accordance with an embodiment.

FIG. 2 further illustrates the base 100 of the player machine when a seat 250 and a tall, curved display topper 240 have been connected. In some examples, the player machine is a slot machine. The display topper 240 may include one or more physical, visual, and/or virtual elements to provide gameplay for slots.

In addition to the speakers 120 built into the lower section 103 of the base 100, such as a 50 Watt/4 Ohm subwoofer speaker, the seat 250 may include additional speakers 202, such as two 25 Watt/8 Ohm speakers in an upper section 203 of the seat 250. Additional speakers may be included in the topper 240, such as two 25 Watt/8 Ohm speakers 208 at the top of the topper 240 and two 25 Watt/8 Ohm speakers 210 at the bottom of the topper 240. In addition to those speakers, a 50 Watt/4 Ohm rumble speaker 204 may be provided in the bottom section 205 of the seat 250. This many speakers may enable a variety of audio effects, especially if a range of speaker types are used, including tweeters, midranges and subwoofers or woofers.

FIGS. 3A-3E illustrate player machines providing different types of casino games. According to some examples, different games may be provided by toppers added to the base 100, as previously discussed. However, other styles of individual player machines, including standard player cabinets, and machines with or without removable toppers, may be usable with various aspects and embodiments discussed herein.

Figure 3C:
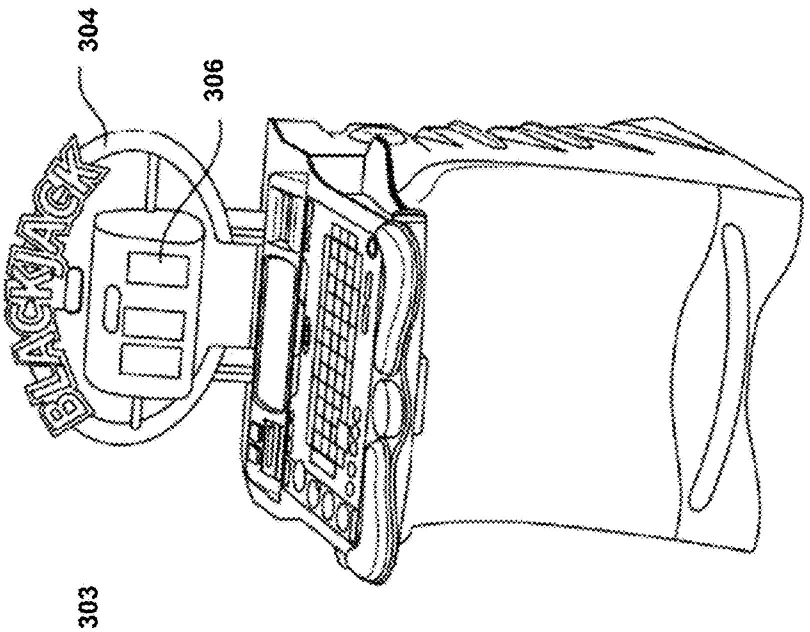
FIG. 3C is a diagrammatic, perspective view of an example player machine for card games, such as blackjack, in accordance with an embodiment.
Figure 3B:
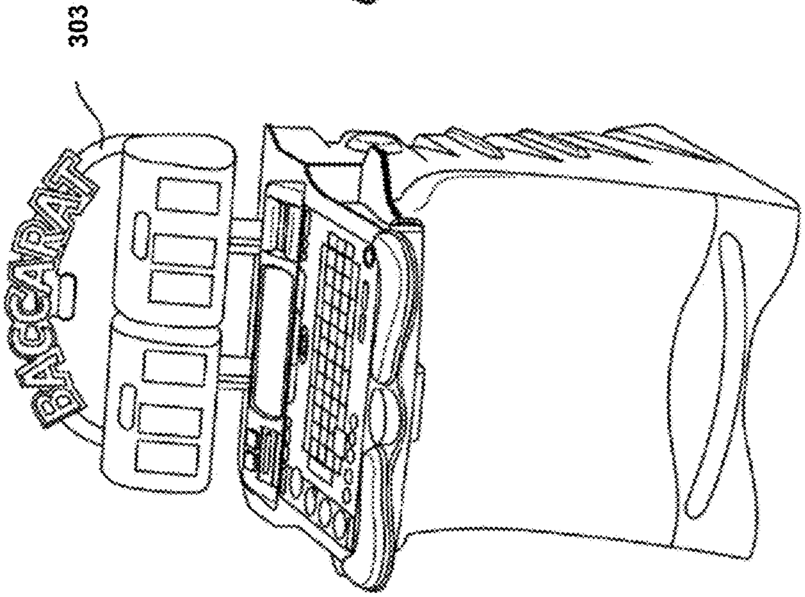
FIG. 3B is a diagrammatic, perspective view of an example player machine for card games, such as baccarat, in accordance with an embodiment.
Figure 3A:
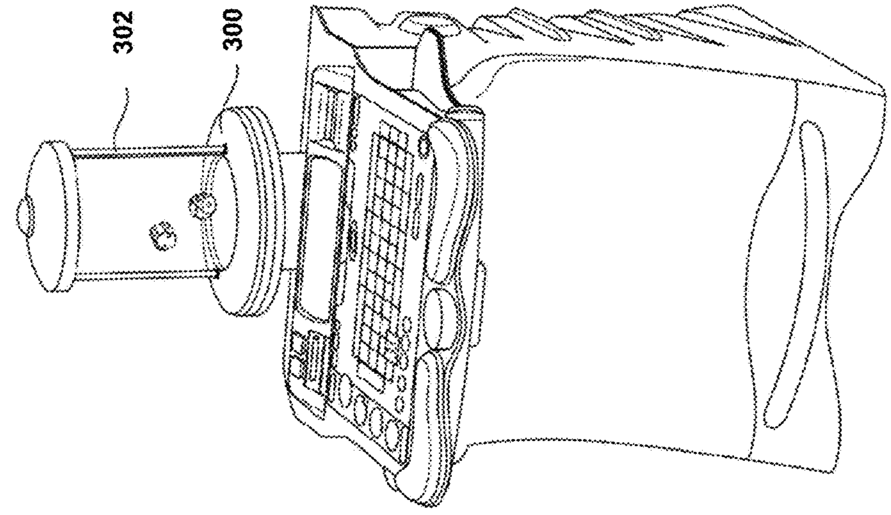
FIG. 3A is a diagrammatic, perspective view of an example player machine for a dice game, in accordance with an embodiment.

FIG. 3A illustrates a player machine providing a dice game. According to some embodiments, a dice topper 300, may enable craps, sic-bo, and other types of dice games to be played. In some examples, the player machine may include a random generator (not shown) for controlling the randomness of the dice roll in order to make a game fair. Even though the dice are being tossed as part of the game in the see-through section 302 of the dice topper 300, the game cycle speed may be just as fast as slot machine game cycles, thereby providing a different and more exciting form of a game with at least the same revenue potential as a slot machine being played for the same period of time. Depending on the type of game incorporated into the topper, the base 100 may send random results for the game to the topper and in other cases the topper may send the random results to the bottom. For example, in the dice game, the resulting throw of the dice may be randomly affected by a random generator in the base, but the resulting throw cannot be predetermined so it has to be determined at the topper and then sent to the base 100.

FIGS. 3B and 3C illustrate player machines providing card games. Although FIG. 3B illustrates a baccarat game 302 and FIG. 3C illustrates blackjack 304, the player stations may be configured to provide any of a variety of card games, including but not limited to poker, Texas Hold 'Em, Dai Bacc, and other card game variations. Some player machines providing card games may include a card mechanism 306, such as a SUZO card flipper module, that may flip physical playing cards under control of the random generator. The card decks may be varied depending on the game, such as a classic deck with or without jokers, and cards including the back sides of cards so cards can be covered.

Figure 3D:
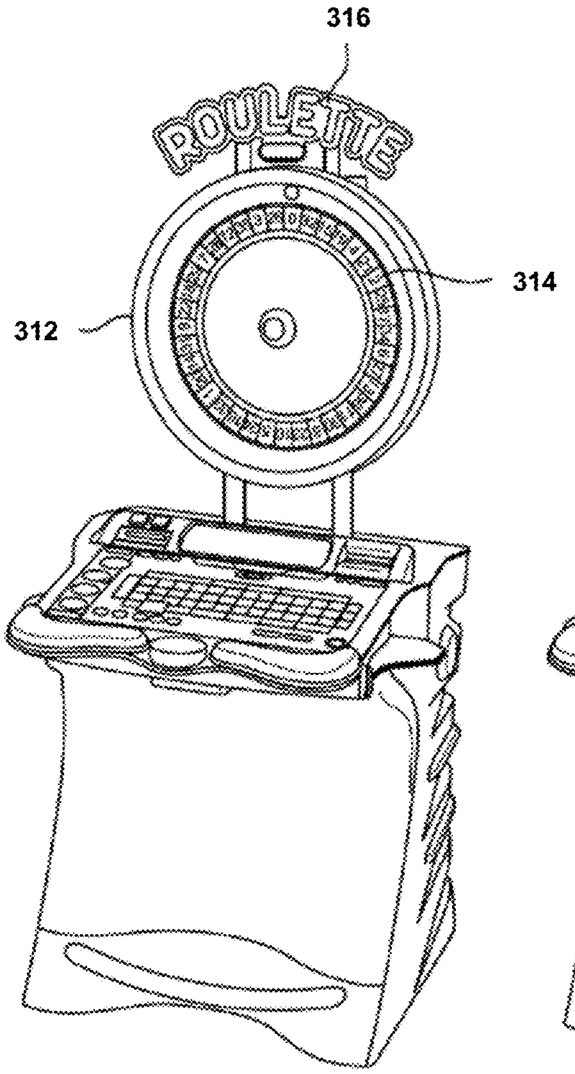
FIG. 3D a diagrammatic, perspective view of an example player machine for roulette games, in accordance with an embodiment.
Figure 3E:
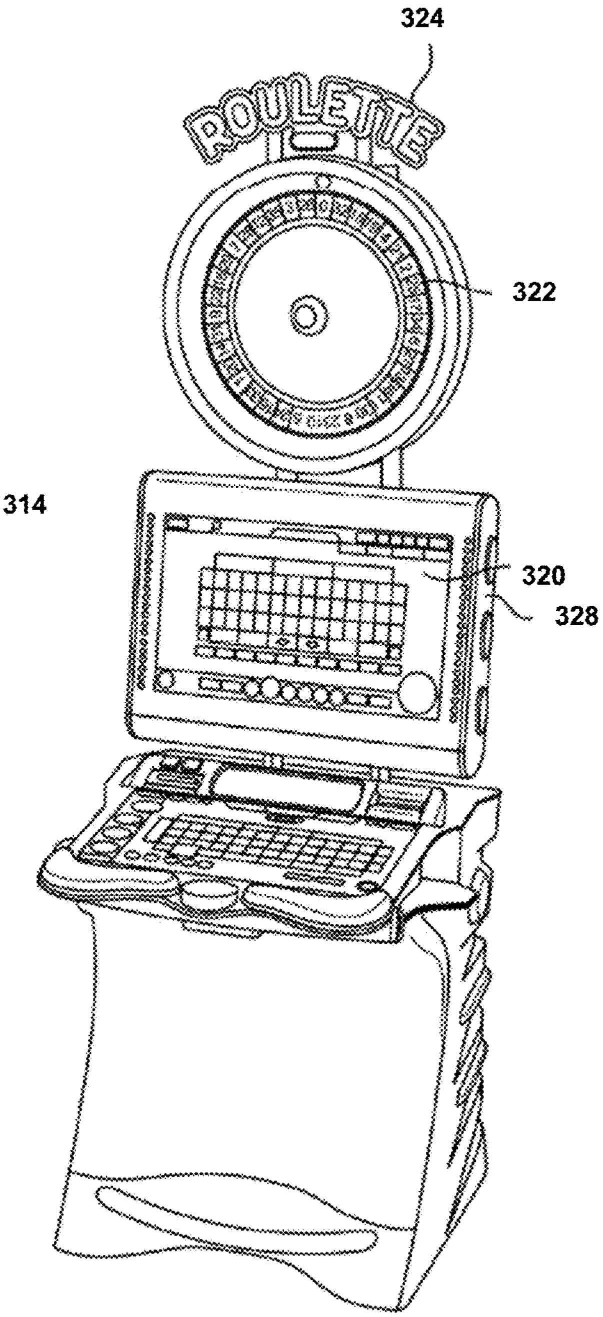
FIG. 3E is a perspective view of an example player machine with an additional display, in accordance with an embodiment.

FIGS. 3D and 3E illustrate player machines providing roulette games. FIG. 3D illustrates a configuration with a vertical roulette wheel topper 302 and signage 316 on top of the roulette wheel 314. FIG. 3E illustrates a configuration including an additional display 328, on top of which is a mounted roulette wheel 322 and signage 324. Other games that include a spinning wheel, such as Big Six, WHEEL OF FORTUNE or similar games.

Figure 4:
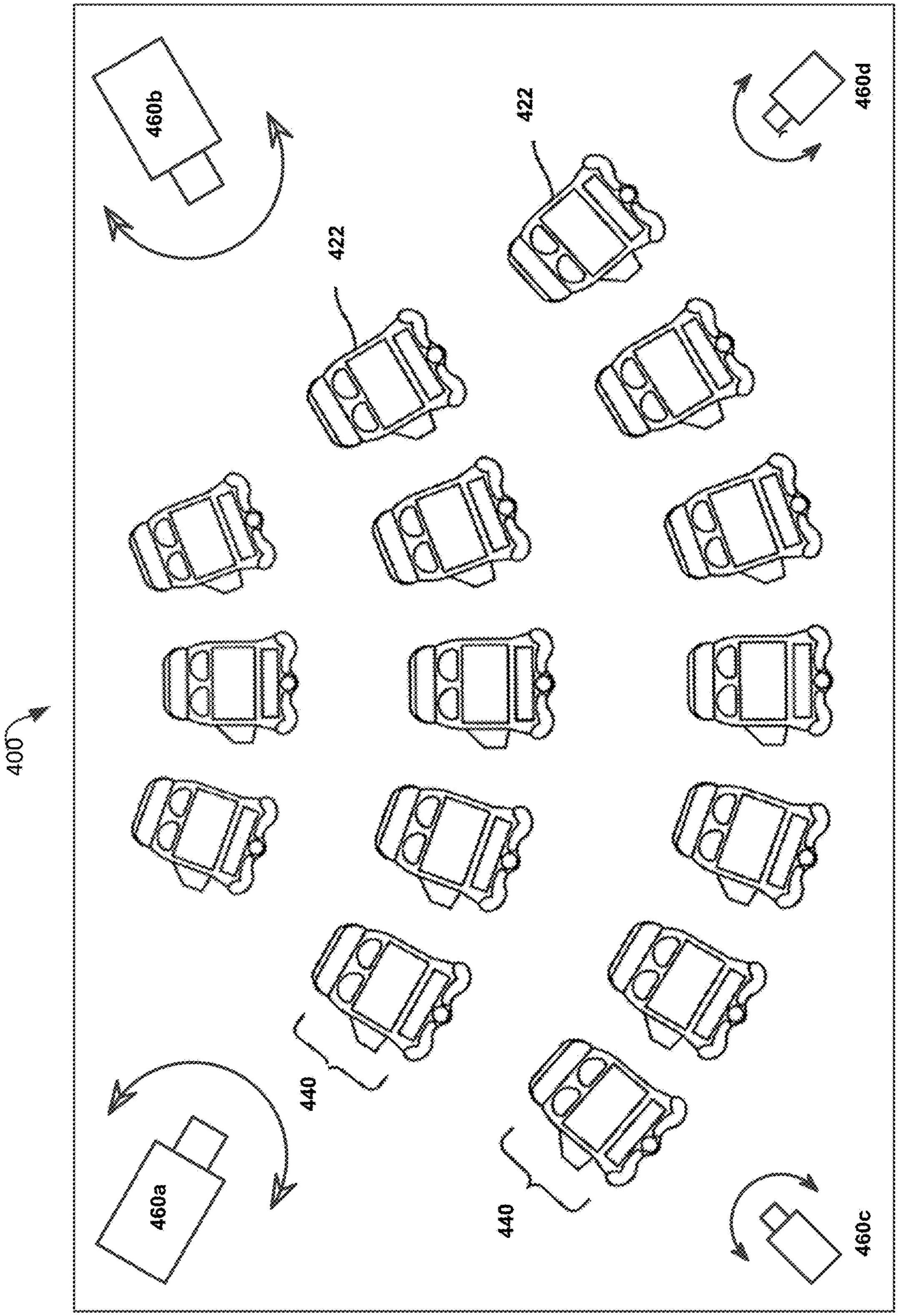
FIG. 4 is a diagrammatic view of a gaming floor with player machines, in accordance with an embodiment.

FIG. 4 provides an example floor plan of a casino pit 400 with a plurality of player machines 440. As discussed herein, the player machines may provide a variety of betting and casino games, including but not limited to poker, craps, roulette, blackjack, other card games, dice games, and video games, as well as a variety of slot machines. In some examples, the player machines are only remotely playable. In other examples, one or more player machines may also be played live.

According to some examples, the casino pit 400 is in a dedicated gaming area, which may be a gaming floor or a separate room in which one or more remotely accessible player machines are located. As discussed herein, a player machine may be reservable for a particular player or player account, such as a VIP player or high roller. Such players may have exclusive access to one or more machines within the casino pit 400, such that other players are unable to play the machine. The option to reserve and/or play an exclusive gaming machine may attract new players and encourage existing players to play more. According to various examples, the casino pit 400 may include any or all of the player machines 440.

One or more cameras 460*a-d* may provide video output of the casino pit 400. Such cameras may be positioned in different areas to provide different views of the gaming floor. In some examples, one or more cameras 460*a-d* may be focused on, and/or optionally directed, e.g., via a user device or other computing device, to a particular player machine. As players may not be playing the machines that are dedicated for remote play, one of the one or more cameras 460*a-d* may be positioned in front of a player machine, such as at the top of a seat if a seat is provided or on a stand where the seat would normally be located.

The video output may be streamed to a user device, such as a smartphone, personal computer, or other gaming device. In some examples, input at the user device may select a first camera (e.g., camera 460*a*), and live video output from the first camera may be viewed at a display associated with the user device. Input at the user device may also adjust the camera's video, for example, causing a closer view or zoomed in view of an object within the casino pit 400, such as a player machine 440, or moving the camera to focus on a different area. Such user device input may also enable live video feed switching between cameras, e.g., from a first camera 460*a* to any other camera 460*b-d*. In various embodiments, input received at the user device may also adjust any or all of the cameras' fields of views, to view a desired region of interest. Changes to camera views may occur before, during, or after gaming events, to promote control and gameplay customization by a player operating a user device.

In some examples, camera(s) 460*a-d* may include an image sensor configured to capture image data on a continuous basis. The at least one image sensor may be configured to capture image data associated with particular game cycles of the games played at a player machine 440. Image sensor may provide the captured image data to a controller associated with the camera 460 as a video stream, a sequence of individual image frames, raw image data, and the like. In an embodiment, a controller (in the form of a computer system, see e.g., FIG. 7) associated with the player machine 440 and/or user device may configure the image sensor by specifying a frame-rate, a resolution, a color value, a video stream encoding format, a subset of the image sensor's available pixels to activate and/or deactivate, and the like.

In some examples, image data captured by an image sensor may provide a live video feed of operations happening at a player machine 440. In an embodiment, the camera may capture image data for a predefined period of time, such as a particular game cycle. For example, such predefined periods may be associated with a dice roll, roulette ball launch, a roulette ball landing result, a slot roll, a card draw, a betting window associated with a particular game, or another event occurring at a player machine 440.

In an embodiment, the image sensor is configured to capture image data associated with a particular area of the player machine, such as a screen 422 or a region on a topper. For example, if a roulette wheel were located on a topper of a player machine, the image sensor may capture image data corresponding to the any or all of a launch point, an arc portion of annular track, a predefined reference point of roulette wheel, a table stop position of roulette wheel, and the like. As discussed herein, the image sensor may be remotely controlled, and the captured image data may correspond to input received at the user device.

Figure 5B:
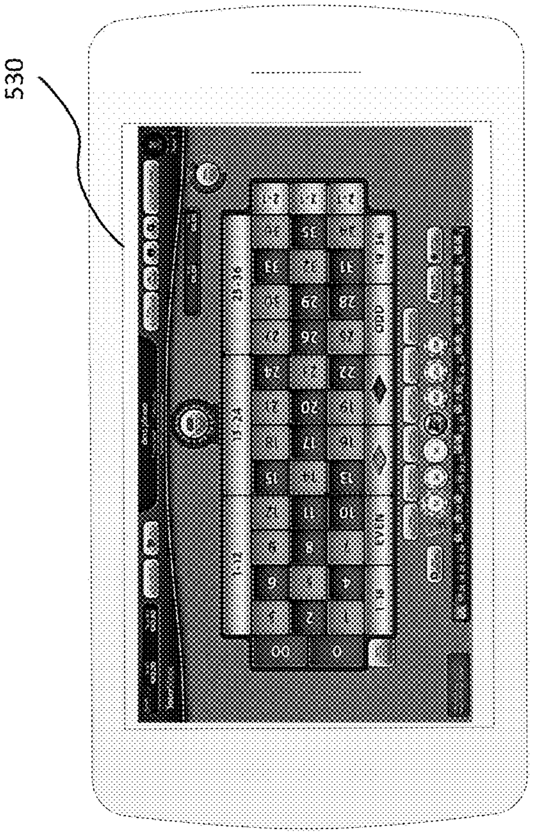
FIG. 5B is a game video feed, in accordance with an embodiment.
Figure 5C:
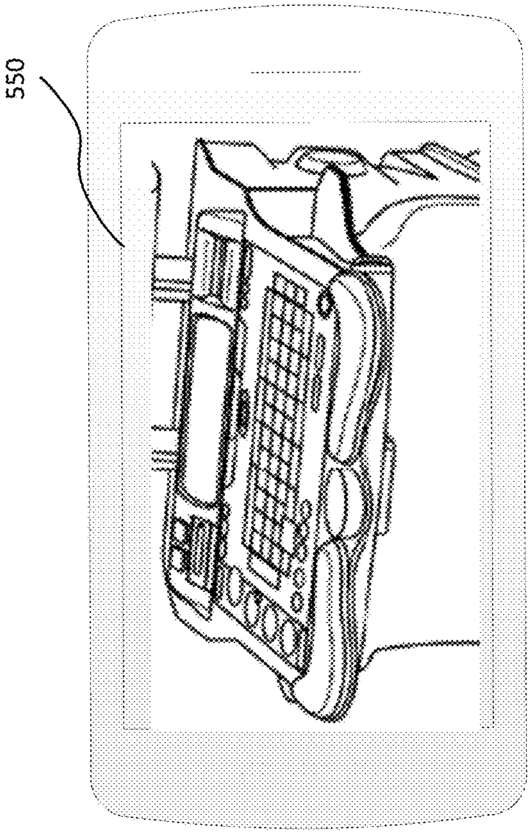
FIG. 5C is a player station video feed, in accordance with an embodiment.
Figure 5A:
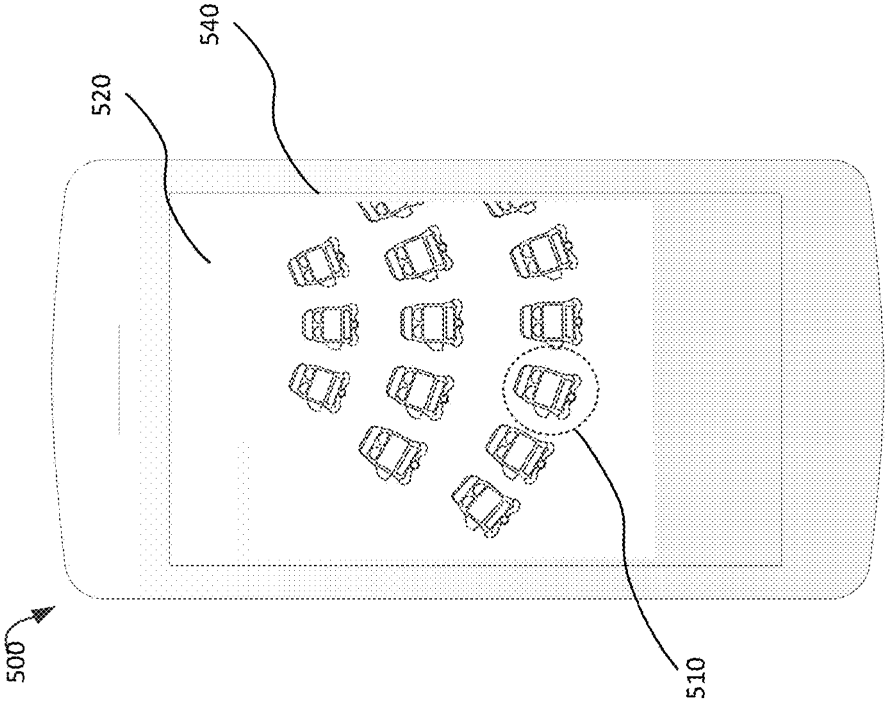
FIG. 5A is an interactive gaming floor video feed, in accordance with an embodiment.

FIGS. 5A-C illustrate interactive gaming and video stream switching techniques occurring at a user device 500. In FIG. 5A the player device may display a live video feed 520 associated with a scene, such as video of the casino pit 400 captured by a camera (e.g., any of cameras 460*a-d*).

FIG. 5B illustrates live gaming output 530 streamed to an interactive gaming screen. The live gaming output may be streamed following a selection, e.g., selection 510, of a player station to initiate gameplay. Although FIG. 5B illustrates a betting layout for a roulette game, the live gaming output will reflect whichever game is associated with the selected play station. As discussed herein, the game may be slots, roulette, poker, or another, card, dice, or video-based game.

FIG. 5C illustrates a switch to a different field of view 550. In some examples, input at the user device may switch between live video output from a first camera (e.g., live video feed 520) to live video output from a second camera. The second camera view may show a region of interest at the selected play station. The region of interest may be a player control area or a screen. Various embodiments enable user input to switch between different regions of interest, which may be associated with an area on the player machine, or in the casino pit. Some embodiments enable switching between live video output (e.g., live video feed 520) and the live gaming output (e.g., live gaming output 530). In any of these examples, user device input may enable zooming in and out of a view provided by a live video feed or a live gaming feed and may move the camera view so as to change the field of view.

In various embodiments, the user device is at least one of a phone, a smartphone, a tablet, a personal computer, or a gaming device. In some examples, the live video feed 520 may be manipulated using a screen tap, voice-command, motion, selection, or other interactive device, such as a stylus, mouse, controller, or other peripheral. A player may zoom in or out of the live video feed 520 using a pinching motion bringing two fingers together or apart to control the zoom level. In other examples, a user may tap the screen (e.g., single tap, double tap, multi-tap, short press, long press, etc.) at the desired zoom location, or draw a circle, box, or other shape around an area or object of interest. Via voice-command, the user may simply instruct the user device to zoom into the scene, which then slowly zooms until the user instructs the user device to stop or a permitted maximum zoom is achieved.

As seen in FIG. 5A the display may highlight a selection 510 made by any of the motions, taps, or interactions discussed herein. After the selection is confirmed, verified, or otherwise satisfies a visual threshold, the video stream may switch from camera the live video feed from a first camera to live gaming output, such as video output from a player machine.

In an example, a player may select a particular player machine shown in a scene by zooming in on the player device. When the player zooms in close enough that the screen of the selected player device meets a threshold, the video stream from camera 460 is stopped, and the video output from the selected player device fills device screen 540. The player may then control the player machine by touching the user interface controls displayed on the device screen 540.

In some embodiments, the selection threshold may be a tap selection of the chosen player machine. In other embodiments, the selection threshold occurs when the selected player machine is zoomed in on to at least a certain point. For example, the camera video stream may stop and transfer to the live gaming output when the player zooms in far enough to only see the screen of the player machine. In another example, the camera video stream may stop and transfer to the live gaming output when a particular section of the player machine fills the user device screen 540. The particular section may be a gaming area, a screen area, a control area, or other part of the player machine.

According to various aspects, the live video feed 520 may stream a default scene view indicative of a first field of view. The first field of view may be some or all of the gaming floor. The first field of view may be larger than a screen of any player machine. When the scene is adjusted to fill the screen 540 with the screen or gaming area of a selected player machine, the video stream may switch from the camera to the player machine. In some examples, the switch may occur when an element of the player machine, e.g., screen bevels, a frame, a side portion of the player machine, etc., are no longer in view on screen 540. Accordingly, the video stream switch may occur when the first field of view adjusts to a second field of view within the first field of view.

As illustrated in FIG. 5B, when the live video stream switches from the camera 460 to live gaming output 530 (e.g., player machine video), the player can play the game directly on their device. A player may make bets, gaming selections, interactions, and other gaming input and interaction as if play were occurring live at the player machine. At any time, the player may also zoom back out sufficiently to switch back to the camera video stream, which may allow the player to confirm that the player is seeing the live play even while zoomed in on the screen of the player machine. The ability to switch back and forth between the camera video stream and the player machine video stream creates a more secure and authentic experience for the player, as though they were truly within the live casino environment, instead of playing remotely somewhere else.

In some examples, players may place bets using a wallet saved on the user device. Funds may be transferred via the wallet to the gaming application or other means to place bets similar to how bets would be made at the player machine. Some funds may be in credits. In examples, the denominations of the bets made by the remote players are the same as the local player. In examples, the denominations of the bets made by the remote players are different from the local player. In examples, the denominations of the bets made by the remote players are higher or lower than the denomination of the bets by the local player. In examples, the currencies of each of the bets by remote and local players may be different. The local player may be betting $10 per game, but one remote player may be betting $1 per game, another ¥100, another £50, another €0.50, etc. If the local player wins a game, each player that bet along with the local player will also win and each one would be paid based on the amount they actually bet.

In some examples, one or more peripherals may be connected to the user device to enhance the gaming experience. For example, a button (e.g., "bash button") may be connected to the user device to allow players to initiate certain gaming events by activating the button. Other types of peripherals may be applicable, based on the player machine and/or game type. In some examples, the peripheral may be connected through a Universal Serial Bus (USB). In another example, a card reader may be connected to the user device, to enable users to add funds, log in, or access loyalty programs, discounts, free games, and the like.

The gaming experience and gaming interactions at the player device may occur in real time, thus providing a live gaming experience to players. This also allows players who are remote or otherwise unable to play directly on at a player machine to play. The remote control of the player machine, via any of the techniques discussed herein, enable more players to access the player machines. In addition to improving gaming access, the techniques also provide variety as to how games are played, which may also increase player interest, entertainment, and participation. Such improvements can further benefit the gaming location and its profitability since more players can access the games and play remotely, and the number of unoperated player machines at any given time will likely be reduced.

Figure 6:
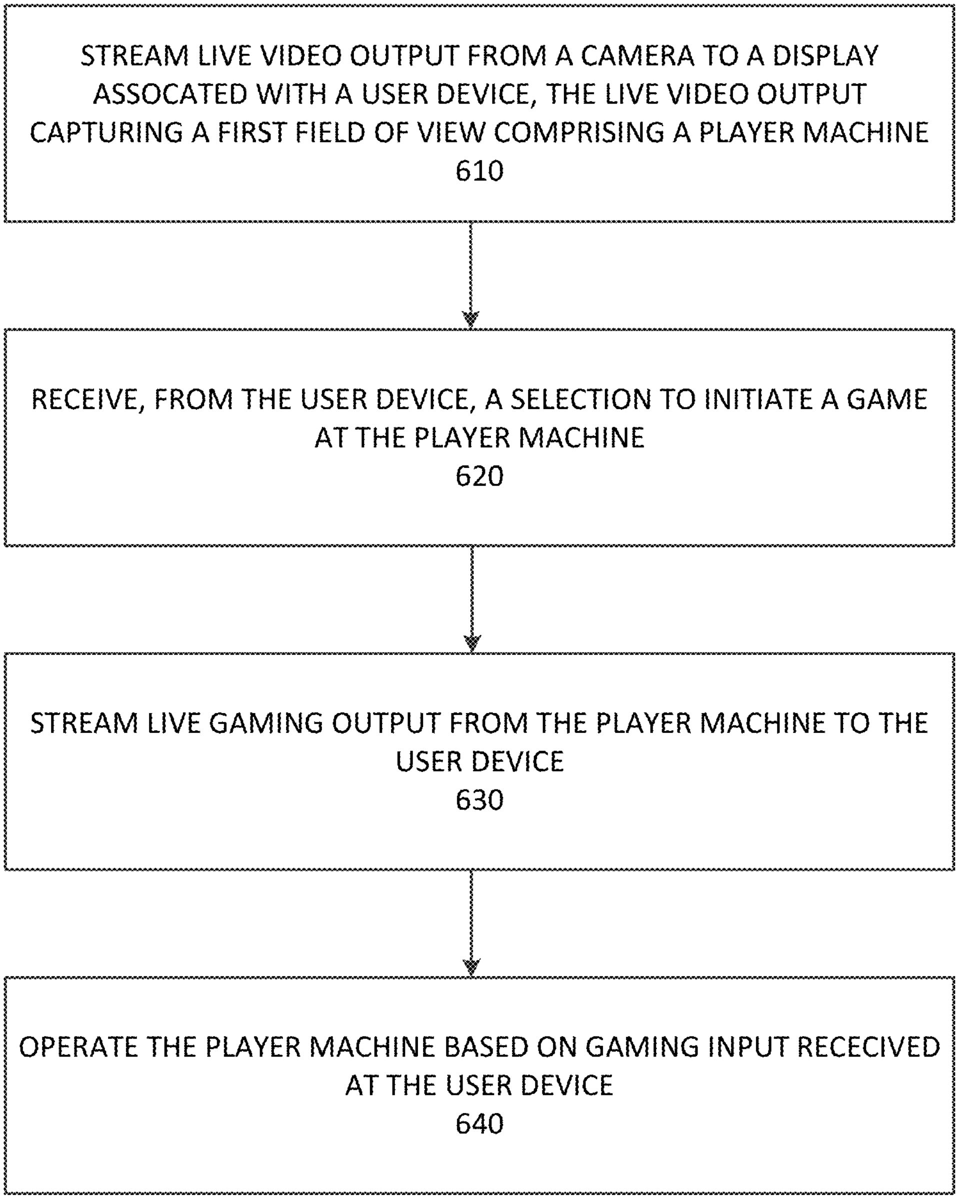
FIG. 6 is a flowchart for live gaming operations, in accordance with an embodiment.

FIG. 6 provides a flowchart of a live gaming operation, in accordance with various aspects. Such operations may occur using one or more computing devices, including a processor and memory. Various techniques may utilize one or more cameras, user devices (e.g., cell phone, smartphone, PC, gaming device, etc.), player machines, or applications operating on a user device or other computing device. In some examples, a user device may include a downloadable application, which provides access to the camera and player machine(s) and manages one or more operations described herein. In some examples, the application may communicate with one or more remote computing devices, servers, databases, and computing elements to manage communications and operations between various devices.

At block 610, aspects may stream live video output from a camera to a display associated with a user device, wherein the video output captures a first field of view comprising a player machine. As discussed herein, the first field of view may be a gaming floor (e.g., casino pit 400), at least one player machine, or other live view within a room or gaming location. In an example, the first field of view captures a casino pit having one or more remotely accessible player machines. In another example, the first field of view captures a gaming screen on a player machine and a surrounding element of the player machine. The surrounding element may be a screen bevel, a frame, a side portion of the player machine, among others. In some examples, the live video output may be changed based on input received at the user device. For example, the live video stream may switch from a first video output from a first camera to a second video output from a second camera.

In various examples, the first field of view may be adjusted, via input at the user device, to a second field of view. In some examples the second field of view is an area within the first field of view. The first field of view may be a gaming area, and the second field of view may be a player machine element, such as a screen of a player machine. In other examples, the second field of view may be an area adjacent to the first field of view. As discussed herein, the determination may be based on a threshold, such as a visual threshold or a selection threshold. Similar to the first field of view, the second field of view may provide a view of an area or an object in real time.

At block 620, aspects may receive input from the user device to initiate a game at the player machine. The input may include a tap, pinch, hold, or other motion or manipulation of live video output. The selection may also identify a particular player machine, an availability, or other gaming information. In some examples, the input may enable a zoom in or out on various areas within or surrounding the first field of view. The input may also include a motion performed on the display, the motion indicative of a selection of a player machine or gaming area on the player machine. The motion may be a zooming motion, a circular motion, a screen tap, or a screen hold. According to some aspects, the video output on the display may update in real-time, based on the player input.

At block 630, aspects may stream live gaming output from the player machine to the user device. The live gaming output may include video output from the player machine. Such video output may be similar to video output provided on the device if it were played in-person.

At block 640, aspects may operate the player machine based on gaming input received at the user device. The gaming input may correspond to gameplay on the player machine. For example, the gaming input may be a selection, a command, such as a launch command, or an initiation of an operation, such as a seed determination. An external controller connected to the user device may be configured to perform gameplay operations and provide gaming input. As discussed herein, the live game may be craps, roulette, blackjack, or another card game, dice game, video game, virtual game, or table game.

Each of the blocks of FIG. 6 may be modified as further discussed herein, such that player input at the user device may switch, as desired, between live video output, live gaming output, and various fields of views from each.

Figure 7:
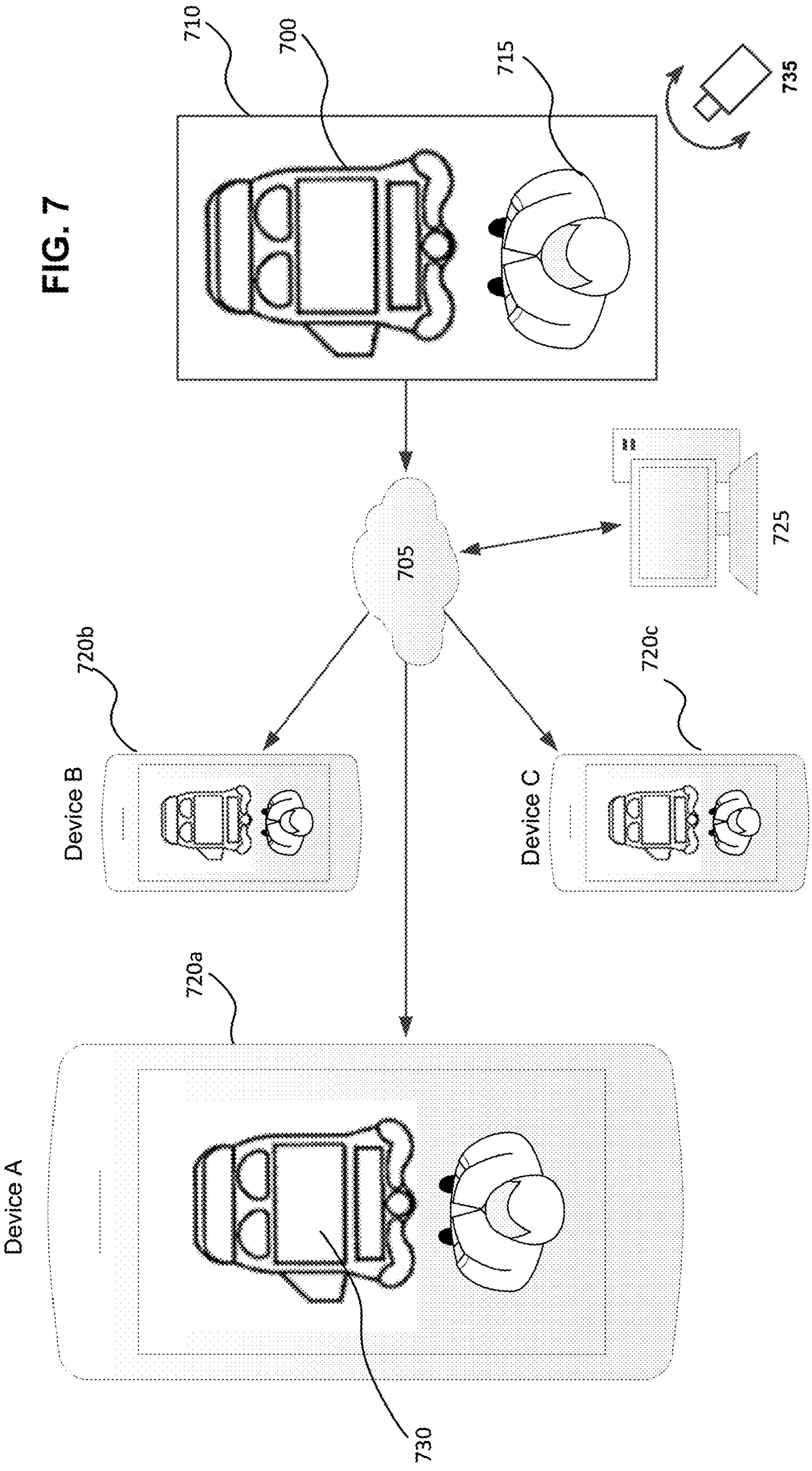
FIG. 7 is a diagrammatic view of remote wagering on a live gaming event, in accordance with an embodiment.

FIG. 7 illustrates a diagram for remote gaming on a live gaming event. Such embodiments may enable a plurality of remote players 720*a-c* to place wagers on a gaming event being played by a local player 715 on a player machine 700 at a gaming location. As discussed herein, some players may have a following of individuals who are interested in their activities. Such players may be influencers, professional gamers, a celebrity or another person of interest. In other situations, a player may amass a following for gaming reasons, such as being on a winning streak or a losing streak for a particular game, having a particular gaming style or strategy, or being entertaining to watch, among many other things. Interested viewers may be located locally, i.e., at the gaming location, or remotely, such as their home, a hotel room, restaurant, a different area of the gaming location or in any of a plurality of other locations.

Various embodiments enable viewers—particularly remote viewers—to participate in the event and wager on the outcome. A plurality of remote players may wager on the result of the gaming event, which is being operated by local player 715. As such, remote players may place wagers on the result of the gaming event without actually playing the game, and without otherwise influencing the gaming event itself. In various embodiments, the plurality of remote players may be on the order or tens, hundreds, or even thousands of players.

Such gameplay may create additional interest and excitement in the gaming event. Remote players may, for example, make wagering decisions based on gaming decisions they believe the local player 715 will or will not make. Remote players do not necessarily need to know how to play the game on the player machine (e.g., poker, slots, blackjack, etc.), but rather bet on an outcome of the game. The outcome of the game may refer, for example, to whether the local player 715 wins or loses the gaming event, whether the local player wins or loses their bet, how much the local player 715 has won or lost (e.g., in a current round, during all gameplay), a particular result of the game or a round of the game (e.g., certain symbols for slots, a card value for blackjack, a roulette outcome, etc.), any of a plurality of gaming decisions the local player 715 may make or has made, and/or an outcome of any of those decisions. Accordingly, remote players may place back bets and lay bets on any gaming outcome associated with the local player.

In some examples, the player machine 700 is a machine designated for remote wagering. The player machine 700 may be in view within one or more streaming devices, such as camera 735, configured to capture a gaming area, such as area 710, which includes at least one of the player machine 700 and the local player 715. In other examples, the gaming area may include a player input region, a screen of the player machine, or another field of view.

According to some embodiments, a remote player may select, from their phone or other remote user device, an individual machine from a plurality of machines within a gaming location (see, e.g., FIG. 4). An overview of the gaming location, such as a casino floor, may be provided to the remote user device. A remote player may select a particular player machine being operated by a local player. In other examples, a listing of available games for remote wagering may be provided to the remote user device. A selection of the desired gaming event for remote viewing a wagering may generate a first field of view of the gaming area (e.g., area 710) on the remote user device.

In some embodiments, a remote player may adjust a field of view of the gaming area. FIGS. 5A-C illustrate various examples of views that may be provided to the remote user device. The live video output captured by camera 735, for example, may be live streamed to one or more remote player devices 720*a-c*. Remote players may, for example, interact with the streamed video input to customize a viewing experience of the gaming event. In some examples, a remote player may switch from an overview, as illustrated in area 710 to a closer view of the player 715 and/or the player machine 700, such as a screen 730 of the player machine.

As illustrated in FIG. 7, the gaming area 710 captured by the one or more streaming devices (e.g., camera 735) may be provided, via a network 705, to one or more user devices (e.g., devices 720*a-c*) for remote viewing and/or wagering. The network 705 may be public, private, or hybrid, hosted on a cloud, for example, and utilize one or more servers and network components, as further discussed in FIG. 9.

A gaming platform 725 may be in communication with network 705 to send, receive, and process information relating to any wagers being placed on the gaming event at player machine 700. In some examples, the gaming platform 725 may receive the streamed video input 710, and perform operations including but not limited to determining a type of game from the streamed video input, determining available wagers for the gaming event, setting a betting window during which wagers may be received from any of devices 720*a-c*, resolving wagers, connecting a player account, managing communications between devices (e.g., devices 720*a-c*, player machine 700), displaying information relating to the gaming event, wagers, one or more remote players, player accounts, device information, and the like.

According to various examples, the gaming platform 725 may perform such operations in real-time, so that the remote player may play along with and experience the gaming event occurring in real-time at the player machine 715.

In some examples, a streaming device may stream live video input to an application, webpage, or other interface operating on each remote user device such that the live video input may be provided on a display (e.g., screen) associated with the remote user device. In some examples, the application may be downloaded on the remote user device and be an exclusive medium through which wagers, gaming events, and remote gameplay may be accessed. In other examples, one or more applications may be utilized to provide the video stream to the user device. For example, a first application may host the live stream video input, and a second application may handle wagering operations. A third application may connect to the live stream, analyze the video output, and generate an interface to be displayed on the user device. According to some examples, the interface may be configured to display the live video stream, enable communications between one more devices (e.g., comments, messages, interactions), display wagers, display wagering outcomes, display available games, and otherwise provide an interface through which the remote player may customize a viewing and/or gaming experience.

Figure 8:
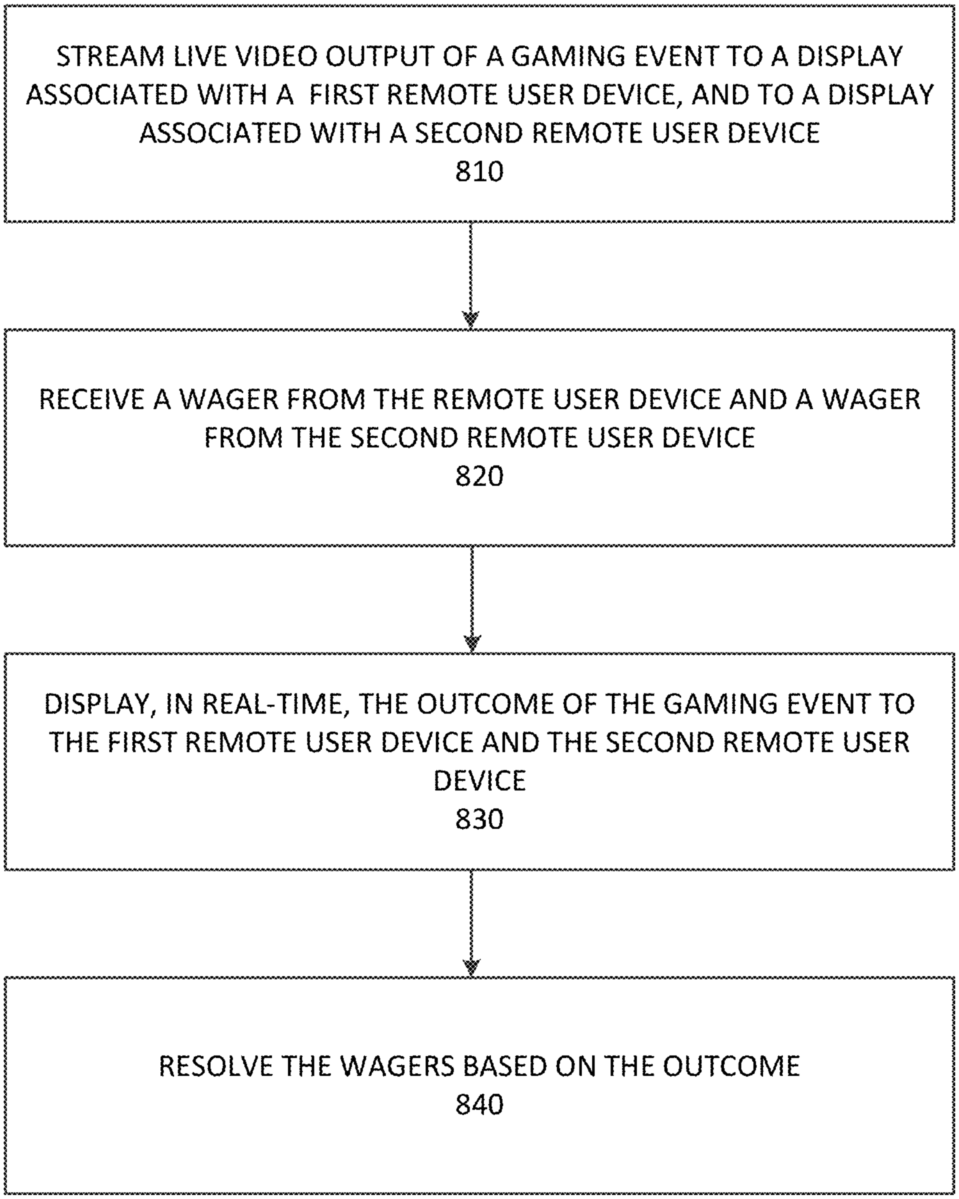
FIG. 8 is a flowchart for remote gaming operations, in accordance with an embodiment.

FIG. 8 illustrates a flow chart for remote gaming operations, in accordance with various aspects. Such operations may occur using one or more computing devices, including a processor and memory. Various techniques may utilize one or more cameras, user devices (e.g., cell phone, smartphone, PC, gaming device, etc.), player machines, or applications operating on a user device or other computing device. As discussed herein, a user device may include at least one downloadable application, providing access to live video output, and managing one or more operations described herein. In some examples, the application may communicate with one or more remote computing devices, servers, databases, networks, and computing elements to manage communications and operations between various devices.

At block 810, aspects may stream live video output of a gaming event to a display associated with a first remote user device, and to a display associated with a second remote user device. The gaming event occur at a player machine operated by a live, local player. In some examples, the machine is remotely operable and playable. The player machine may be an individual, physical player machine providing one or more games, including but not limited to slots, poker, roulette, craps, blackjack, sic-bo, baccarat, or other card, dice, roulette, or casino games. In some examples, the player machine is a standalone machine, such as those described in FIGS. 1, 2, and 3A-E. In other examples, the player machine may be part of a larger, stadium-style configuration. The gaming event may be a live event, with wagers and other gaming information provided at the player machine. Some gaming events may be hybrid gaming events, with some gaming aspects occurring at the player machine, and other aspects (e.g., dice throws, roulette spins, etc.) occurring elsewhere. In various examples, the remote user devices have no effect on an outcome of the gaming event. In other words, gameplay occurring at the player machine is independent of any wagers placed regarding an outcome of the game.

As discussed herein, the live video output may be streamed from one or more streaming devices, such as a camera or an image sensor. At least one camera may be placed at the gaming location and capture a first field of view, which may include at least one of: the player machine and the local player. In some examples, the field of view may be adjusted based on player input received at a remote user device. For example, input at a remote user device may switch between video output from a first streaming device to video output from a second streaming device. Input at the remote user device may zoom in or out on the player machine (e.g., on a player input area, a screen associated with the player machine, etc.), and/or include one or more areas of the gaming location. The gaming location may be a casino, a casino floor, or other area on which one or more player machines are accessible for gameplay by a local player. The first remote user device and the second remote user device may display different fields of view based on input respectively received at each device.

At block 820, aspects may receive a wager from the first remote user device, and a wager from the second remote user device. Wagers may correspond to a gaming event outcome, and include back bets and lay bets, which respectively refer to whether a gaming event occurs or does not occur. In some examples, the wager may relate to an overall gaming outcome (e.g., win/lose) of the gaming event being played by the local player. In other examples, the wager may relate to one or more gaming decisions made by the local player. In a streamed blackjack game, for example, a remote wager may be placed on a gaming decision relating to a local player's action during a round. The wager may be placed on whether the local player will hit, stand, double down, split, or take insurance, for example. A wager may also be placed on whether the local player wins or loses one or more rounds of play.

In various embodiments, remote user devices may actively participate in the gaming event, and place specific wagers on the gaming event. For example, a first wager from a remote user device may correspond to a predicted outcome selected at the first remote user device. The predicted outcome may comprise a set of numbers, colors, and/or symbols corresponding to the gaming event. In an example, for a roulette game operating on the player machine, a wager may correspond to a set of one or more numbers, symbols, or colors, associated with the roulette outcomes. Remote player devices may place individual, customizable wagers corresponding to the same gaming event. As such, the one or more remote players may actively participate in the gaming event occurring at the player machine.

As noted above, depending on the player machine and type of remote play, the gaming event and/or one or more gaming aspects may or may not be require a live player, operating the machine in real-time. Using a roulette game for example, a live player may initiate the gaming event via a roulette wheel spin. In another embodiment, the roulette wheel spin may occur, automatically, at or after a particular time period, once the betting window closes, or any of a variety of combinations and events. In another example, in a slot game, remote players may place separate, unique bets on the same gaming event. In a slot-based game, the gaming event may be a spin. However, any of a variety of games may be operable on a player machine, including but not limited to card games, dice games, roulette games, slot games, lottery games, and other casino games.

Accordingly, wagers may apply to any of a variety of aspects associated with the gaming event. Wagers may be placed on a gaming outcome for a game operated in real-time by a live player, on one or more gaming decisions of the live player, on one or more rounds of play, or on one or more aspects of a remotely operated game. Such variety and flexibility can increase player engagement and enable remote players to participate, regardless of familiarity or skill level associated with a game. These techniques can also enable players to play on particular, preferred, or "lucky" machines when such players are unable to physically play at the gaming location. Wagering on live gaming events and real-time players (e.g., the local player) further provides a unique gaming and entertainment experience. Remote players may strategize, play, and wager on any or all of the gaming event itself, the local player, and various gaming events and decisions. These techniques are widely applicable to any of a variety or combination of games, such as blackjack, poker, roulette, slots, other cards games, dice games, and casino games. Therefore, there exists significant opportunity to provide a breadth of games, attract players, and increase gaming, player engagement, and profits.

The wagers may be received during a betting window. The betting window may correspond to a period of time before the local player takes an action with respect to a gaming event. In an example, if the gaming event is slots, the betting window may be a period of time before the local player initiates a next spin. In some cases, the betting window may correspond to a same or a different period of time in which the local player may place a wager. In other examples, the betting window may be a set period of time, such as five, ten, thirty, forty-five, or sixty seconds prior to a start of the gaming event, or other occurrence with respect to the gaming event (e.g., a new round, a new game, etc.).

According to some examples, a display associated with the user device may provide the live video stream of the gaming event occurring at the player machine, along with an input area to receive a wager entered at a remote user device. In some examples, a wager screen may be shown concurrently with the live video stream. In other examples, the wager screen may be shown instead of the live video stream. The displayed screen (e.g., wager screen, gaming screen, live video stream) may be modified to player preference based on input received at a remote user device.

In some examples, the gaming screen from the player machine may be live streamed to the remote user device. The remote player may toggle between the gaming screen and a live stream showing the player machine and/or the local player. In some examples, multiple views may be displayed on the remote user device, and customized based on player preference. Such aspects enable remote players to view aspects of the gaming event they find most interesting. Some remote players may prefer to view the player, while others may prefer to view the gaming event. Such flexibility provides greater choice and control of the gaming experience.

At block 830, aspects may display, in real-time, the outcome of the gaming event to the first remote user device and to the second remote user device. The outcome may include a live view of the gaming event outcome (e.g., a slot spin, the final symbols, lines, etc.), a listing of the result, a view of the gaming screen on the player machine, or any of a plurality of views. Similar to the display options discussed above, in some examples, remote players may customize the live video output streams in order to watch the gaming event how they would like to. The first remote user device may display a video stream showing the player machine and the local player. The second remote user device may display gaming output (e.g., a player screen and/or a display) associated with the player machine.

At block 840, aspects may resolve the wagers based on the outcome. A player account may be linked to each wager, such that any funds won or lost may be transferred to/from the player account. Wager resolutions may utilize a wallet associated with respective player accounts. Wager resolutions may occur automatically without any input or acceptance actions on the remote user device.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 9:
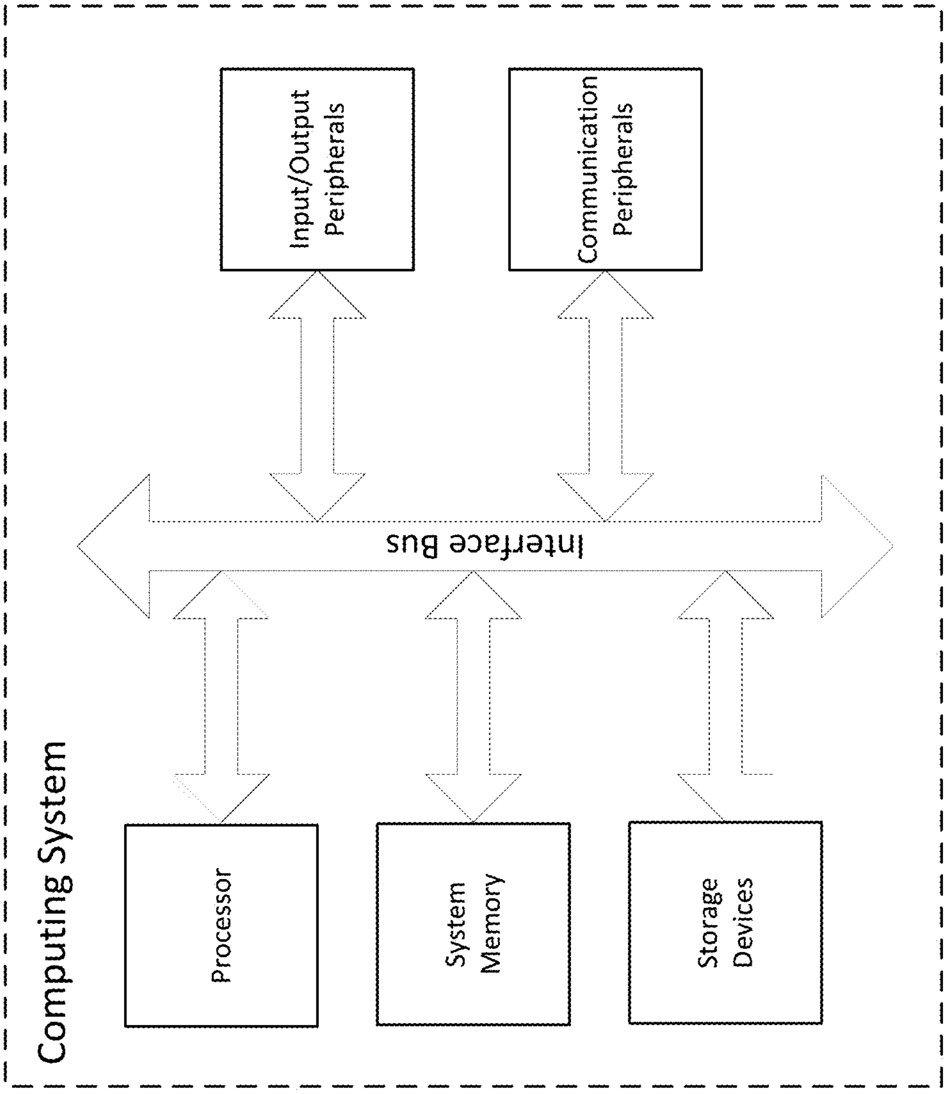
FIG. 9 is an illustration of an exemplary block diagram representing a general-purpose computer system in which aspects of the methods and systems disclosed herein or portions thereof may be incorporated.

The techniques described above can be implemented on a computing device associated with a gaming device (e.g., a roulette machine operating a live roulette game), a plurality of computing devices associated with a plurality of gaming devices, a controller in communication with the gaming device(s) (e.g., a controller configured to synchronize the gaming devices(s)), or a plurality of controllers in communication with the gaming device(s). Additionally, the techniques may be distributed between the computing device(s) and the controller(s). FIG. 9 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the roulette wheel velocity adjustments and result detection optimization, as described above. The computing system components may be present in the gaming device, in a server or other component of a network, or distributed between some combinations of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, and velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile, or non-volatile storage.

In an embodiment, a method for wagering on a live gaming event, comprises: streaming live video output of a gaming event to a display associated with a first remote user device, wherein the gaming event is occurring on an individual player machine at a gaming location, and wherein the individual player machine is operated in real-time by a local player at the gaming location; streaming live video output of the gaming event to a display associated with a second remote user device; receiving, during a betting window, a first wager from the first remote user device and a second wager from the second remote user device; displaying, in real-time, an outcome of the gaming event to the first remote user device and the second remote user device; and resolving the first wager and the second wager based on the outcome.

In an embodiment, wherein the first remote user device and the second remote user device do not affect the outcome of the gaming event.

In an embodiment, wherein the betting window corresponds to a period of time before the local player takes an action with respect to the gaming event.

In an embodiment, wherein the gaming event relates to at least one of a slot game, a card game, a dice game, and a casino game.

In an embodiment, further comprising: updating, in response to input received at the first remote user device, the live video output from a first field of view to a second field of view associated with the gaming event.

In an embodiment, wherein the first field of view comprises a gaming area on the individual player machine, and wherein the second field of view is at least one of: an alternate view of the individual player machine, a region within the first field of view, the local player, and a view of the gaming location.

In an embodiment, further comprising: concurrently streaming the first field of view and the second field of view on the display.

In an embodiment, wherein the first remote user device and the second remote user device display different fields of view associated with the live video output.

In an embodiment, wherein the gaming location is a casino.

In an embodiment, wherein resolving the first wager and the second wager comprises updating a wallet respectively associated with each wager.

In an embodiment, wherein the first wager from the first remote user device corresponds to a gaming decision to be made by the local player during the gaming event.

In an embodiment, wherein at least one wager comprises a back bet or a lay bet.

In an embodiment, wherein each wager corresponds to an outcome of the gaming event.

In an embodiment, a system for wagering on a live gaming event, comprises: a gaming event on an individual player machine, wherein the individual player machine is operated in real-time by a local player at a gaming location; a streaming device configured to stream live video output of the gaming event to a first remote user device; and a gaming interface operating on the first remote user device, the gaming interface configured to at least: display live video output of the gaming event at a display associated with the first remote user device, wherein the live video output captures a first field of view comprising a gaming area on the individual player machine; display live video output of the gaming event at a display associated with a second remote user device; receive, during a betting window, a first wager from the first remote user device; display, in real-time, the outcome of the gaming event to the first remote user device; and resolve the first wager based on the outcome.

In an embodiment, wherein the gaming interface is associated with a casino application operating on the remote user device.

In an embodiment, wherein the streaming device is a camera capturing at least one of the individual player machine and a display associated with the individual player machine.

In an embodiment, wherein the streaming device streams live gaming output generated by the individual player machine.

In an embodiment, wherein the individual player machine is operated in real-time by a local player at the gaming location.

In an embodiment, wherein the individual player machine is a slot machine.

In an embodiment, wherein the first remote user device comprises at least one of a smartphone, personal computer, and a gaming device.

In an embodiment, wherein the gaming event includes at least one of slots, poker, roulette, craps, blackjack, sic-bo, baccarat, and a casino game.

In an embodiment, a non-transitory computer-readable storage medium comprises instructions stored thereon that cause a computing device to at least: stream live video output of a gaming event to a display associated with a first remote user device, wherein the gaming event occurs on an individual player machine at a gaming location, and wherein the individual player machine is operated in real-time by a local player at the gaming location; stream live video output of the gaming event to a display associated with a second remote user device; receive, during a betting window, a first wager from the first remote user device and a second wager from the second remote user device; display, in real-time, the outcome of the gaming event to the first remote user device and the second remote user device; and resolve the first and the second wager based on the outcome.

In an embodiment, wherein the instructions further cause the computing device to: update, in response to input received at the first remote user device, the live video output to display, on the first remote user device, a second field of view associated with the gaming event, and update, in response to input received at the second remote user device, the live video output to display, on the second remote user device, a second field of view associated with the gaming event.

In an embodiment, a method for remote wagering on a live gaming event, comprises: streaming live video output of a gaming event to a display associated with a first remote user device, wherein the gaming event generates a random selection of symbols, and wherein the gaming event is provided on a physical player machine at a gaming location; streaming live video output of the gaming event to a display associated with a second remote user device; receiving, during a betting window, a first wager on the gaming event from the first remote user device and a second wager on the gaming event from the second remote user device, wherein the first wager comprises a predicted outcome comprising a set of symbols selected at the first remote user device, and the second wager comprises a predicted outcome comprising a set of symbols selected at the second remote user device; streaming, in real-time, the outcome of the gaming event to the first remote user device and the second remote user device; and resolving the first wager and the second wager based on the outcome.

In an embodiment, wherein the gaming event is a slot game, operated in real-time, by a local player at physical player machine.

In an embodiment, wherein the first remote user device and the second remote user device do not affect the outcome of the gaming event.

In an embodiment, wherein the live video output comprises a first field of view displaying the physical player machine.

In an embodiment, adjusting the field of view in response to user input at the first remote user device.

In an embodiment, wherein resolving the first wager and the second wager comprises adding or deducting value to a player account associated with each wager.

In an embodiment, further comprising: updating, in response to input received at the first remote user device, the live video output from a first field of view to a second field of view associated with the gaming event.

In an embodiment, wherein the first field of view comprises a gaming area on the physical player machine, and wherein the second field of view is at least one of: an alternate view of the physical player machine, a region within the first field of view, a local player at the physical player machine, and a view of the gaming location.

In an embodiment, wherein the first remote user device and the second remote user device display different fields of view associated with the live video output.

In an embodiment, wherein a denomination of a wager placed by the local player at the gaming location is different from the first wager.

In an embodiment, wherein a currency of a wager placed by the local player at the gaming location is different from a first currency of the first wager.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A method for wagering on a live gaming event, comprising:

streaming live video output of a gaming event to a display associated with a first remote user device, wherein the gaming event is occurring on an individual player machine at a gaming location, and wherein the individual player machine is operated in real-time by a local player at the gaming location;

streaming live video output of the gaming event to a display associated with a second remote user device;

receiving, during a betting window, a first wager from the first remote user device and a second wager from the second remote user device;

displaying, in real-time, an outcome of the gaming event to the first remote user device and the second remote user device;

in response to input received at the first remote user device, automatically switching from a first stream comprising live video output captured by a first camera to a second stream comprising a live gaming output generated by the individual player machine, wherein the live video output depicts a first field of view and the second stream depicts a second field of view, and wherein the input received at the first remote user device comprises a zooming input that causes a portion of the individual player machine to satisfy a selection threshold on the display;

switching back to the first stream comprising the first field of view in response to further input comprising zooming out; and resolving the first wager and the second wager based on the outcome.

2. The method of claim 1, wherein the first remote user device and the second remote user device do not affect the outcome of the gaming event.

3. The method of claim 1, wherein the betting window corresponds to a period of time before the local player takes an action with respect to the gaming event.

4. The method of claim 1, wherein the gaming event relates to at least one of a slot game, a card game, a dice game, and a casino game.

5. The method of claim 1, further comprising: updating, in response to input received at the first remote user device, the live video output from the first field of view to the second field of view associated with the gaming event.

6. The method of claim 1, wherein the first field of view comprises a gaming area on the individual player machine, and wherein the second field of view is at least one of: an alternate view of the individual player machine, a region within the first field of view, the local player, and a view of the gaming location.

7. The method of claim 1, further comprising: concurrently streaming the first field of view and the second field of view on the display.

8. The method of claim 1, wherein the first remote user device and the second remote user device display different fields of view associated with the live video output.

9. The method of claim 1, wherein the gaming location is a casino.

10. The method of claim 1, wherein resolving the first wager and the second wager comprises updating a wallet respectively associated with each wager.

11. The method of claim 1, wherein the first wager from the first remote user device corresponds to a gaming decision to be made by the local player during the gaming event.

12. The method of claim 1, wherein at least one wager comprises a back bet or a lay bet.

13. The method of claim 1, wherein each wager corresponds to an outcome of the gaming event.

14. A system for wagering on a live gaming event, comprising:

a gaming event on an individual player machine, wherein the individual player machine is operated in real-time by a local player at a gaming location;

a streaming device configured to stream live video output of the gaming event to a first remote user device; and a gaming interface operating on the first remote user device, the gaming interface configured to at least:

display live video output of the gaming event at a display associated with the first remote user device, wherein the live video output captures a first field of view comprising a gaming area on the individual player machine;

display live video output of the gaming event at a display associated with a second remote user device;

receive, during a betting window, a first wager from the first remote user device;

display, in real-time, the outcome of the gaming event to the first remote user device;

in response to input received at the first remote user device, automatically switching from a first stream comprising the live video output to a second stream comprising a live gaming output generated by the individual player machine, wherein the live video output depicts a first field of view and the second stream depicts a second field of view, and wherein the input received at the first remote user device comprises a zooming input that causes a portion of the individual player machine to satisfy a selection threshold on the display;

switching back to the first stream comprising the first field of view in response to further input comprising zooming out; and resolve the first wager based on the outcome.

15. The system of claim 14, wherein the gaming interface is associated with a casino application operating on the remote user device.

16. The system of claim 14, wherein the streaming device is a camera capturing at least one of the individual player machine and a display associated with the individual player machine.

17. The system of claim 14, wherein the streaming device streams live gaming output generated by the individual player machine.

18. The system of claim 14, wherein the individual player machine is operated in real-time by a local player at the gaming location.

19. The system of claim 14, wherein the individual player machine is a slot machine.

20. The system of claim 14, wherein the first remote user device comprises at least one of a smartphone, personal computer, and a gaming device.

21. The system of claim 14, wherein the gaming event includes at least one of slots, poker, roulette, craps, blackjack, sic-bo, baccarat, and a casino game.

22. A non-transitory computer-readable storage medium comprising instructions stored thereon that cause a computing device to at least:

stream live video output of a gaming event to a display associated with a first remote user device, wherein the gaming event occurs on an individual player machine at a gaming location, and wherein the individual player machine is operated in real-time by a local player at the gaming location;

stream live video output of the gaming event to a display associated with a second remote user device;

receive, during a betting window, a first wager from the first remote user device and a second wager from the second remote user device;

display, in real-time, the outcome of the gaming event to the first remote user device and the second remote user device;

in response to input received at the first remote user device, automatically switching from a first stream comprising live video output captured by a first camera to a second stream comprising a live gaming output generated by the individual player machine, wherein the live video output depicts a first field of view and the second stream depicts a second field of view, and wherein the input received at the first remote user device comprises a zooming input that causes a portion of the individual player machine to satisfy a selection threshold on the display;

switching back to the first stream comprising the first field of view in response to further input comprising zooming out; and resolve the first and the second wager based on the outcome.

23. The non-transitory computer-readable storage medium of claim 22, wherein the instructions further cause the computing device to:

update, in response to input received at the first remote user device, the live video output to display, on the first remote user device, and the second field of view associated with the gaming event, and update, in response to input received at the second remote user device, the live video output to display, on the second remote user device, the second field of view associated with the gaming event.

24. A method for remote wagering on a live gaming event, comprising:

streaming live video output of a gaming event to a display associated with a first remote user device, wherein the gaming event generates a random selection of symbols, and wherein the gaming event is provided on a physical player machine at a gaming location;

streaming live video output of the gaming event to a display associated with a second remote user device;

receiving, during a betting window, a first wager on the gaming event from the first remote user device and a second wager on the gaming event from the second remote user device, wherein the first wager comprises a predicted outcome comprising a set of symbols selected at the first remote user device, and the second wager comprises a predicted outcome comprising a set of symbols selected at the second remote user device;

in response to input received at the first remote user device, automatically switching from a first stream comprising live video output captured by a first camera to a second stream comprising a live gaming output generated by the individual player machine, wherein the live video output depicts a first field of view and the second stream depicts a second field of view, and wherein the input received at the first remote user device comprises a zooming input that causes a portion of the individual player machine to satisfy a selection threshold on the display;

switching back to the first stream comprising the first field of view in response to further input comprising zooming out;

streaming, in real-time, the outcome of the gaming event to the first remote user device and the second remote user device; and resolving the first wager and the second wager based on the outcome.

25. The method of claim 24, wherein the gaming event is a slot game, operated in real-time, by a local player at physical player machine.

26. The method of claim 24, wherein the first remote user device and the second remote user device do not affect the outcome of the gaming event.

27. The method of claim 24, wherein the live video output comprises the first field of view displaying the physical player machine, and wherein the first field of view is adjusted in response to user input at the first remote user device.

28. The method of claim 27, wherein resolving the first wager and the second wager comprises adding or deducting value to a player account associated with each wager.

29. The method of claim 24, further comprising: updating, in response to input received at the first remote user device, the live video output from the first field of view to the second field of view associated with the gaming event, wherein the first field of view comprises a gaming area on the physical player machine, and wherein the second field of view is at least one of: an alternate view of the physical player machine, a region within the first field of view, a local player at the physical player machine, and a view of the gaming location.

30. The method of claim 24, wherein the first remote user device and the second remote user device display different fields of view associated with the live video output.

* * * * *